United States Patent Office 3,211,673
Patented Oct. 12, 1965

3,211,673
MANUFACTURE OF ACTIVE CHAR BY SOLVENT EXTRACTION OF COAL AND ACTIVATION OF THE RESIDUE
Horace E. Luntz, Ponca City, Okla., and Frederick W. Braun, Beaverton, Oreg., assignors, by direct and mesne assignments, of one-half to Continental Oil Company, Ponca City, Okla., a corporation of Delaware, and one-half to Pacific Power and Light Company, Portland, Oreg., a corporation of Maine
No Drawing. Filed Dec. 26, 1961, Ser. No. 162,219
9 Claims. (Cl. 252—445)

This invention relates to the production of an activated, high surface area char from residual coal remaining after the coal has been subjected to solvent extraction. More particularly, but not by way of limitation, the present invention relates to a method for producing particulate carbonaceous particles of large surface area and high adsorptive activity using coal or peat, particularly low grade coal of relatively low fixed carbon content, as the source material. In another of its aspects, the invention relates to the novel compositions produced by the process of the present invention, which compositions are useful in many applications involving separation by selective adsorption, and molecular support upon a particulate substrate characterized by high surface area.

In the application for U.S. Letters Patent of Walker J. Duffie, John D. Bryan, Bill E. Claybough and Frederick W. Braun, entitled "Coal Conversion Process," now Serial No. 161,805, filed of even date herewith, now abandoned, and assigned to the assignee of the present application, a process is disclosed for converting inferior grades of coal into low ash content coke. The process there described is initiated by extracting particulate coal with a gas oil fraction which is produced in the subsequent coking operation. The extract, amounting to about 20% to 50% of the coal subjected to extraction, is then passed into a coking operation where it is converted to a low ash coke suitable for use in the manufacture of carbon electrodes of high purity. The process possesses marked advantage over other types of coke-producing processes in that the raw material used may be a low grade coal of the bituminous, subbituminous or lignitic type. The equipment required is relatively inexpensive, and the process may be easily integrated with a typical petroleum-refining operation, using equipment and techniques commonly used and available in such operations.

In the above-referenced patent application, brief reference is made to the high surface area property of the residual coal which remains following extraction with the gas oil solvents there described. Our investigations have now confirmed our surmise that such residues might possess additional properties which permit them, with little or no additional processing, to be used as activated chars of high surface area. In addition we have found that petroleum gas oil fractions as well as gas oil obtained through coking coal extract can provide residual coal of high surface area, which can also be converted to valuable activated chars. The materials which we obtain as products may be successfully employed in such processes as adsorption of color bodies in water purification and sugar refining, etc., selective adsorption of higher-boiling constituents from gaseous mixtures (for example, L.P.G. from natural gas), catalyst support (for example, nickel catalyst for hydrogenation processes), deodorizing of waste gases for control of atmospheric pollution, and removal of odorous compounds such as phenol from water. Many other applications of such activated chars will immediately occur to those skilled in the art and many articles and books describe in detail traditional uses of material of this general type.

Although the solvent extraction of some types of coal for other purposes, such as, for example, the production of coke by the Pott-Broche process, has previously been practiced, the concept of producing activated, high surface area char by solvent extraction of low or inferior grades of coal is believed to be new with applicant. The activated chars produced by the method of this invention from such source have the advantage of being produced much more cheaply than conventional activated charcoals and bone chars. This cost feature is particularly significant in that it may, in many cases, eliminate the economic necessity of regenerating the material for reuse as is now commonly done with expensive, conventional chars.

The invention is also important and valuable in that the process is readily adapted to use in combination with existing petroleum-refining processes, and provides a valuable use for the carbonaceous residue remaining after solvent extraction of the coals used in coke production processes. Use may be made of readily available gas oil streams derived from thermal or catalytic cracking operations usually carried on in petroleum refining and, as pointed out previously, when the process of the invention is integrated with the coke production process described in the patent application cited above, a substantial portion or all of the solvent used for extraction may be derived from the final coking operation which produces a gas oil fraction as a side product.

As indicated above, our investigations have indicated that the particulate residue remaining after such solvent extraction procedure possesses surface area, pore size and chemical activity properties which assure its usefulness in some of the processes in which the more expensive active chars now available on the market are utilized. However, we have further determined that this residual carbonaceous material may also be subjected to further refinement to improve its usefulness in certain applications, notably, treatment of water to remove odorous and undesirable taste-producing substances. The ash content of the residue may also easily be substantially reduced if the anticipated utilization of the material makes low ash content a desirable property. Also, by proper briquetting or agglomerating processing, followed by controlled reduction of particle size, the friability of the activated particles may be reduced. This is an especially desirable characteristic in situations where the regeneration of the char to permit repeated use is desirable or necessary.

From the foregoing discussion, it will be apparent that a major object of the present invention is to provide a process for producing a relatively inexpensive, high surface area, activated char using low grade or inferior quality coals or peat.

Another object of the present invention is to provide a process for extracting low grade coal with a gas oil solvent readily available as a standard refinery stream in a petroleum-refining operation or a gas oil solvent obtained from coking coal extract, which coal, following extraction, is of high surface area and porosity.

A further object of the present invention is to produce high surface area, activated chars by a novel process which may be integrated with a process for producing high grade coke, so that low grade coal constitutes the common raw material source of both the char and the coke.

Another object of the invention is to provide a process for producing high surface area, activated chars having a low phenol value and adapted for use in purifying water.

A further object of the invention is to provide novel activated char materials for use in processes based upon the unit operation of preferential adsorption, which chars are much less expensive than the activated chars previously marketed for such uses.

Other objects and advantages of the invention will become apparent as the description of the invention proceeds and its details become better understood.

In one embodiment of the invention, particles of coal are placed in a fixed bed and subjected to extraction with a suitable solvent. As to the types of coal which may be extracted in accordance with the present invention, we prefer to employ a bituminous or subbituminous coal, although other forms, such as lignitic coal, i.e., brown coal or lignite, can be used. Also, anthracite coal and the like can be used. The preferred feed materials are coals of inferior quality having a fixed carbon content of less than about 85% and substantial ash content. An example of such coal is Glenrock coal of Wyoming which is classified according to the ASTM classification as "subbituminous C coal, having a moist B.t.u. content of about 8,700, a fixed carbon content of about 50%, and an ash content varying from 5% to 24%, depending upon the seam." If desired, the ash content can be reduced before extraction by employing any of a variety of known techniques, such as the float-sink density separation of ash, the acid-caustic soda extraction, or other techniques for reducing the ash content. It is also frequently desirable to de-ash the residues remaining after extraction, since the usual ash constituents may interfere with the effective use of the residues as decolorizing chars and in other applications as well. More is said about such subsequent or post de-ashing hereinafter.

Although other solvent types may be employed in the extraction steps of the present invention, we prefer to use a gas oil having an API gravity between 5 and 11, and having ASTM D-86 and/or ASTM D-1160 (10 mm. Hg) distillation ranges of between about 400° F. and 800° F., and between 250° F. and 600° F., respectively. The use of such gas oil solvents is especially desirable since such materials are readily available products of the petroleum-refining process and also may be readily derived from the coke-manufacturing process described in the cited application. In the petroleum-refining process, such gas oils are produced in the thermal and catalytic cracking or coking of petroleum. Petroleum-derived gas oils may desirably be used initially when the processes of producing activated char and high grade coke are integrated, and such use may then be continued until such time as gas oil extraction solvent derived from the coking operation is brought on stream. It will be apparent that when the process of the present application is combined in this manner with the coking process described in the cited application, the overall economy of the combined processes may be improved by using such coker gas oil as the extraction solvent.

In practicing the invention, the solvent is passed through the bed of particulate coal at a temperature of between 500° F. and 800° F. under pressures sufficient to maintain the solvent in the liquid state. In using the preferred gas oil solvents, a temperature between 700° F. and 775° F. is preferably employed, and a pressure between atmospheric pressure and 500 p.s.i.g. is utilized, depending upon the boiling range of the solvent employed. At the lower temperatures, the extent of coal extraction is generally less, and the yield of extract also generally falls off at temperatures in excess of 800° F. The solvent may be either percolated downwardly or pumped upwardly through the coal bed.

The percentage of the coal extracted by the solvent is dependent upon the temperature, the time the solvent is in contact with the coal particles, and the amount and type of solvent employed; e.g., condensed ring, high-boiling aromatic solvents provide very good extractions. Particle size of coal is likewise a factor affecting the percentage of coal extracted as discussed below. Preferably the portion of the coal extracted by the solvent is between 25% and 50% of the total original weight on a moisture and ash-free basis. The solvent should be contacted with the particulate coal for at least about twenty minutes, and preferably should be flowed through the bed of particulate coal at a space velocity of between 0.1 and 10 pounds of solvent per hour per pound of coal. The solvent is circulated through the coal at this space velocity until between one and ten parts thereof per part of coal have passed through the bed, keeping in mind the twenty-minute contact time which is the preferred minimum.

In practicing the invention, the coal is subdivided before placing it in a cylindrical, vertical or upright extraction tank. The coal preferably should be subdivided into particles not greater than one-half inch in size preferably not less than 0.001 inch in size. If the coal is ground to less than 0.001 inch in size, the extent of the extraction tends to exceed the desired range of 20% to 50% and, additionally, serious problems are introduced in the recovery of the extract from the solvent in downstream processes such as the coking operation mentioned above.

When the requisite amount of solvent has been passed through the extraction vessel, the flow of solvent through the bed of coal is discontinued and a substantial portion of the solvent-extract mixture remains in adherence to the bed of subdivided coal. To remove the solvent and extract therefrom, the bed of coal particles is washed with a material miscible with the solvent at a temperature lower than the extraction temperature. This miscible material boils at a temperature lower than that of the solvent so that it can be separated therefrom. It may be a hydrocarbon fraction produced in the petroleum-refining operation, such as a naphtha fraction boiling between 200° F. and 350° F., or it may be some other low-boiling material, such as methyl ethyl ketone. Before the wash material is used, the temperature of the bed of coal particles can be reduced by the use of low pressure steaming, or by the passage of a purge gas, such as flue gas or nitrogen, through the extraction vessel. The temperature of the extraction solvent may also be gradually lowered to reduce the temperature of the bed of particulate coal before the first gas is introduced thereto. Water can also be used for this purpose, rapid cooling being obtained by the utilization of the latent heat of vaporation absorbed in the conversion of water to steam.

After the bed of coal particles has been reduced to a temperature below that at which the wash material boils at the pressure used, the wash material is passed either upwardly or downwardly through the extraction vessel. However, the washing step is preferably carried out countercurrent to the flow path followed during solvent extraction, that is, the washing material is introduced to the opposite end of the extraction chamber from that into which the extracting solvent was introduced. Carrying out washing in this manner provides an unexpected improvement in the increased removal of residual solvent from the coal bed.

Passage of the wash material through the vessel is continued until all, or the desired amount, of adhering solvent and coal extract is removed therefrom. Ordinarily, about one to five pounds of wash material per pound of coal will remove substantially all of the solvent and coal extract remaining in the extraction vessel. After the coal residue has been purged with steam, or an inert gas, or nitrogen, and is removed from the extraction vessel and dried, the coal residue resulting from such extraction has a high surface area and can be further activated as hereinafter described by treatment with various materials to impart to the residue adsorptive properties, making the particles valuable for use in the removal of color bodies, selective adsorption of gaseous mixtures, catalyst supports, deodorization of gases, and other conventional uses of high surface area adsorbents.

As an alternative procedure to the solvent washing used to remove residual solvent and extract, the coal residue which remains in the extractor may be steam stripped at temperatures between about 500° F. and 800° F. and the residue subsequently cooled with water until the temperature is reduced to a level at which the coal residue can be removed from the extractor. When utilizing steam as the stripping medium, either cocurrent or countercurrent flow of the steam can be employed with substantially the same result; that is, the steam can be introduced at the bottom of the extractor and flowed upwardly through the coal particles or, in the alternative, can be introduced through the top of the extractor and removed at the bottom.

If desired, both steam-stripping and solvent-washing techniques can be combined; that is, removal of the solvent and extract by combined steam stripping and washing with a hydrocarbon wash material may be effected.

In another aspect of the invention, the activated char remaining after the described extraction is further activated, such as by subjecting it to controlled mild oxidation by contacting it at elevated temperatures with suitable gases such as superheated steam, carbon dioxide, or air. The temperature at which such contact is effected will depend upon the particular gas employed and ranges from about 575° F. to 1100° F. for air to as much as 1800° F. for steam and carbon dioxide. It may also be desirable in many cases to reduce the ash content of the residual char material, or to decrease the friability thereof, whether further activation of the residue is effected or not.

Although a number of activation procedures may be utilized to increase the activity of the residual coal remaining after extraction, we have found that contacting the residue with superheated steam under controlled conditions of temperature, pressure, time and steam space velocity is highly effective to increase the activity of the residue particles, particularly with respect to their usefulness in removing odor and taste-producing impurities from water. When activation by contact with superheated steam is used, a compromise must be reached between the loss of carbonaceous material due to "burning" or oxidation by the steam, and increased or higher activity. In other words, severe steaming conditions may, while increasing further the activity of the char produced, reduce its quantity by an undesirable amount. Under optimum conditions, however, a yield of well over 60% of the parent residue may be obtained, while the activity of the char may be increased to a value comparing well with the best commercial chars now available for water purification.

In activating the extract residues by contact with superheated steam, temperatures in the range of 1100° F. to 1800° F. may be utilized, with the steam being passed through the residue for a period of from fifteen minutes to sixty minutes. A quantity of steam is used sufficient to give a weight ratio of residue to steam of between 0.25 and about 1.5. We have obtained superior results when maintaining the steam at a temperature of about 1550° F. for a peroid of about twenty to forty minutes with a residue-to-steam ratio of between 0.8 and 1.4. However, since a number of variables are involved in the process, optimum operating conditions may also be varied. Thus, a high steaming temperature accelerates the activation process, as does a high steam rate. Particle size of the residue is a factor in the extent and speed of activation, with smaller particle sizes favoring more rapid oxidation and greater activation of the carbonaceous material. Lower steam usage (higher carbon-to-steam ratios) appears to favor increased activity. In any event, it should be recalled that excessive steam rates and temperatures can result in the burning of too much carbon with consequent low yields and high ash percentages. Yield must therefore be balanced against the activity level sought.

The following examples are presented in illustration of the various embodiments and aspects of the invention:

EXAMPLE 1

A Glenrock coal of the type previously described was extracted at 750° F., 40 p.s.i.g., for three and one-half hours employing about a 9:1 solvent-to-coal ratio. The solvent used was petroleum coker gas oil having an API gravity of 8.2, an ASTM D–86 distillation range of 470° to 770° F. and a UOP characterization factor of 10.15. The solvent was passed upwardly through the coal bed during extraction. Following the extraction, the residue was washed with methyl ethyl ketone.

Two such extractions were made with the subsequent washing being carried out by passing the methyl ethyl ketone in opposite directions through the extraction chamber in the two runs. The results are set forth in Table I.

*Table I*

|  | Downflow washing | Upflow washing |
|---|---|---|
|  | Run 1 | Run 2 |
| Extraction: |  |  |
| Temperature, °F | 754 | 750 |
| Solvent/coal, lb./lb | 8.75 | 9.14 |
| Time: hours | 3.5 | 3.5 |
| Washing operation: |  |  |
| Methyl ethyl ketone/coal, lb./lb | 3.47 | 3.14 |
| Time: hours | 2 | 2 |
| Residue recovered/coal, lb./lb | 0.52 | 0.58 |

The results demonstrate that more efficient extraction is attained when the wash solvent is passed through the coal bed in a direction countercurrent to the direction of passage of the extraction solvent.

EXAMPLE 2

A number of coal extraction residues representing 20% to 44% extraction (moisture and ash-free basis) were all found to ignite spontaneously in an oven at 220° F. to 230° F. in air when attempting to measure total moisture by ASTM Method D–271–58. This indicated very high surface activity, since coals and cokes do not usually ignite under such conditions.

EXAMPLES 3 AND 4

Subbituminous coal of the following analysis was extracted in the manner described below.

Proximate analysis, percent wt.:
    Moisture _____ 26.49
    Volatile matter _____ 23.32
    Fixed carbon _____ 34.60
    Ash _____ 15.59
Elemental analysis, percent wt. (dry basis):
    Carbon _____ 54.93
    Hydrogen _____ 4.06
    Oxygen _____ 18.21
    Sulfur _____ 0.80
    Nitrogen _____ 0.80
    Ash _____ 21.20
    C/H ratio (atomic) _____ 1.12

The solvent used was topped coker gas oil of the following properties:

|  | Topped coker gas oil (25% Vol. Topped Off) | Coker gas oil before topping |
|---|---|---|
| API gravity | 9.6 | 12.2 |
| Distillation of, ASTM D–1160: | 10 mm. | 2 mm. |
| 5% | 250 | 160 |
| 10% | 278 | 175 |
| 20% | 308 | 206 |
| 30% | 329 | 248 |
| 40% | 348 | 270 |
| 50% | 368 | 291 |
| 60% | 382 | 310 |
| 70% | 395 | 320 |
| 80% | 411 | 342 |
| 90% | 434 | 386 |
| 95% | 460 | 444 |
| EP | 508 | (¹) |

[1] Cracked at 483.

ANALYSIS OF CHEMICAL COMPOSITION AND PHYSICAL PROPERTIES

| | |
|---|---|
| Carbon | 90.27 |
| Hydrogen | 7.78 |
| Oxygen | 0.49 |
| Nitrogen | 0.16 |
| RI at 25° C. | 1.5754 |
| Vis. at 210° F., cs. | 1.70 |
| Refractivity intercept | 1.0851 |
| Percent Ar, percent rings that are aromatic (8) | 79.3 |
| Percent Cr, percent carbon atoms in rings (8) | 72.5 |
| Percent Ca, percent carbon atoms that are aromatic (8) | 57.4 |
| Percent Cn, percent carbon atoms that are naphthenes (8) | 15.1 |
| Percent Cp, percent carbon atoms that are paraffinic (8) | 27.5 |

Two portions of the specified subbituminous coal were extracted with the topped coker gas oil as follows:

| | Example 3 | Example 4 |
|---|---|---|
| Raw coal charged | 9 pounds | 9 pounds. |
| Warmup, charging hot solvent | 1 hour | 1 hour. |
| Extraction temperature | 739° F | 755° F. |
| Solvent pumped downward through coal after warmup | 30 pounds | 90 pounds. |
| Extraction time at extraction temperature | 4 hours | 1 hour. |
| Cool down to about 200° F., using cold solvent | 1 hour | 1 hour. |
| Purge with nitrogen | 10 min | 10 min. |
| Wash with upflow of MEK | 5 gallons | 5 gallons. |
| Purge with nitrogen | 5 hours to gas free. | 5 hours to gas free. |
| Extract yield (moisture and ash-free basis) | 30.8 wt. percent | 42.2 wt. percent. |
| Heat treat 10 grams of residue from above in a furnace at 2000° F. under nitrogen (inert) atmosphere | 1 hour | 1 hour. |
| Surface area (BET) of heat treated product, square meters per gram | 91.2 | 254.9 |

EXAMPLE 5

A subbituminous coal of the following analysis was extracted.

Proximate analysis, percent wt.:
| | |
|---|---|
| Moisture | 28.1 |
| Volatile matter | 32.7 |
| Fixed carbon | 34.9 |
| Ash | 4.3 |

Elemental analysis, percent wt. (dry basis):
| | |
|---|---|
| Carbon | 67.70 |
| Hydrogen | 4.45 |
| Oxygen | 20.76 |
| Sulfur | 0.41 |
| Nitrogen | 0.56 |
| Ash | 6.12 |

B.t.u./lb., (wet basis) __ 8,220

A typical gas oil of 8.8 API gravity was utilized for the extraction which was made in three passes with the residue being cooled down, washed and purged between passes. The conditions obtaining during the three-pass extraction were as follows:

FIRST PASS

| | |
|---|---|
| Raw coal charged | 100 pounds. |
| Warmup, with nitrogen | 5½ hours. |
| Warmup, charging hot solvent | 2 hours. |
| Extraction temperature | 665° F. |
| Solvent pumped upward through coal | 330 pounds. |
| Cool down to about 250° F., using cold solvent | 2 hours. |
| Purge with nitrogen | 1 hour. |
| Wash with upflow of methyl ethyl ketone | 50 gallons. |
| Purge with steam | 5 hrs. to gas free. |
| Extract yield (moisture- and ash-free basis) | 8.7 wt. percent. |

SECOND PASS

Residue from first pass charged.
| | |
|---|---|
| Warmup, with nitrogen | 4 hours. |
| Warmup, charging hot solvent | 2 hours. |
| Extraction temperature | 715–730° F. |
| Solvent pumped upward through coal after warmup | 180 pounds. |
| Extraction time at extraction temperature | 2½ hours. |
| Cool down to about 250° F., using cold solvent | 2 hours. |
| Purge with nitrogen | 1 hour. |
| Wash with upflow of methyl ethyl ketone | 50 gallons. |
| Purge with steam | 3 hrs. to gas free. |
| Extract yield (moisture- and ash-free based on coal charged to first pass) | 38.9%. |

THIRD PASS

Residue from second pass charged.
| | |
|---|---|
| Warmup, with nitrogen | 4½ hours. |
| Warmup, charging hot solvent | 2 hours. |
| Extraction temperature | 710° F. |
| Solvent pumped upward through coal after warmup | 230 pounds. |
| Extraction time at extraction temperature | 4 hours. |
| Cool down to about 250° F., using cold solvent | 2 hours. |
| Purge with nitrogen | 1 hour. |
| Wash with upflow of methyl ethyl ketone | 70 gallons. |
| Purge with steam | 3 hours. |
| Extract yield (moisture- and ash-free based on coal charged to first pass) | 46.1%. |

The residue remaining after extraction had a surface area of 191 square meters per gram.

EXAMPLE 6

Another subbituminous coal was extracted using a topped coker gas oil of the following properties:

| | |
|---|---|
| API gravity | 7.1 |
| Distillation of, ASTM D–1160 __mm__ | 10 |
| 5% | 294 |
| 10% | 312 |
| 20% | 338 |
| 30% | 354 |
| 40% | 366 |
| 50% | 378 |
| 60% | 388 |
| 70% | 400 |
| 80% | 414 |
| 90% | 439 |
| 95% | 458 |
| EP | 508 |

Preparation of the residue consisted of the following steps:

| | |
|---|---|
| Raw coal charged | 9 pounds. |
| Warmup, with nitrogen | 1½ hours. |
| Warmup, charging hot solvent | 1 hour. |
| Extraction temperature | 710–760° F. |
| Solvent pumped upward through coal after warmup | 3 hours. |
| Cool down to about 500° F., using cold solvent | 1½ hours. |
| Wash with upflow of methyl ethyl ketone | 5 gallons. |
| Purge with steam to 550° F. | 2 hours. |
| Purge with nitrogen to cool and remove water | Overnight. |
| Extract yield (mosture- and ash-free basis) | 39.3%. |

The surface areas of the residues obtained in Examples 3, 4 and 5 compare with the following values for calcined coke and for some other materials used in preferential adsorption applications.

| Material: | Surface area square meters/gram |
|---|---|
| Calcined coke | 2.14 |
| Gas mask charcoal | 1000 |
| Silica gel A | 290.0 |
| Silica gel B | 321.0 |
| Silica gel C | 698.8 |
| Silica gel D | 600 |
| Bauxite | 170–230 |
| High grade commercial activated carbon A | 950–1050 |
| Commercial activated carbon B | 135 |
| Commercial activated carbon C | 204 |

The results of the extractions described in Examples 3, 4 and 5 show that the residues produced by the extraction constitute high surface area materials comparable or equal to two out of four commercial silica gels evaluated, commercial bauxite and several well-known commercial activated carbons.

EXAMPLE 7

A test frequently used to assay the quality of color adsorbing carbons is the "iodine number" test. It is a measure of the porosity of the char in terms of pores greater than 10 A. in diameter. The iodine numbers of a number of extraction residue samples were determined and ranged from 650 to 725. This compares with an iodine number of 1225 for a comparative, very high quality standard, and was considered indicative of good color adsorbing properties in view of the relatively low cost of the residues.

EXAMPLE 8

In order to determine the reactivity of the residues to $CO_2$, $CO_2$ was passed through a bed of one of the residues at 800° C. The reactivity index at 800° C. was determined at 1.19. This means that the volume of carbon monoxide (CO) produced at 800° C. is 1.19 times the volume of $CO_2$ entering the chamber containing the residue, and that 59% of the $CO_2$ reacted. Although the $CO_2$ reactivity index is usually determined at 950° C., 100% of the residue tested reacted at lower than 900° C. Therefore, in order to get an index as to its reactivity, it was necessary to measure the reactivity at 800° C. This high reactivity of the residues indicates that the residues are susceptible to a substantial increase in activity by suitable activation procedures.

EXAMPLE 9

As indicated previously herein, it is desirable in some uses of activated carbons to reduce the ash content to a minimum. Thus, although in water-treating carbons, both the $SiO_2$ and CaO usually present in carbonaceous ash can be tolerated, as can any traces of most other minerals likely to be present, this is not the case with decolorizing carbons. These carbons are subject to more rigid specifications and must be deashed. Arsenic, lead, copper, chromium, mercury and iron, in particular, must be present in only very low quantities in decolorizing carbons. Tests were therefore conducted (a) to determine the ash content of some typical residues derived from subbituminous coals, and (b) to determine the composition of the ash present. The results of these tests are recorded in Tables II, III and IV.

Table II

| Residue | Proximate analysis ||||
|---|---|---|---|---|
| | Percent $H_2O$ | Percent volatile matter | Percent fixed carbon | Percent ash |
| 1 | 0.1 | 23.0 | 67.1 | 9.8 |
| 2 | 0.9 | 16.2 | 68.4 | 14.5 |
| 3 | 1.6 | 17.0 | 65.3 | 14.1 |

Table III

SPECTROGRAPHIC ANALYSIS OF ASH CONSTITUENTS, RESIDUE 1 IN TABLE II

Ag—Present  
Au—Not detected  
Al—Present  
As—Present  
Ba—Present  
Be—Not detected  
B—Present  
Ca—Present  
Cd—Present  
Ce—Not detected  
Co—Not detected  
Cr—Present  
Cu—Present  
Fe—Present  
Ge—Present  
Hg—Present  
K—Not detected  
La—Not detected  
Li—Present  
Mg—Present  
Mn—Present  
Mo—Not detected  
Na—Present  
Nb—Not detected  
Ni—Not detected  
Pb—Present  
P—Present  
Pt—Not detected  
Sb—Not detected  
Si—Present  
Sr—Present  
Sn—Not detected  
Ta—Present  
Th—Not detected  
Ti—Present  
U—Not detected  
V—Present  
Y—Present  
Zn—Present  
Zr—Not detected

Table IV

CHEMICAL ANALYSIS OF ASH FOR RESIDUE 1, TABLE II

| | |
|---|---|
| $H_2O$ | 0.01 |
| $SiO_2$ | 64.72 |
| CaO | 18.52 |
| MgO | 5.14 |
| $Al_2O_3$ | 1.68 |
| $Fe_2O_3$ | 8.14 |
| MnO | 0.76 |
| $TiO_2$ | 0.31 |
| Cr | 0.06 |
| S | 0.05 |
| $P_2O_5$ | 0.16 |
| Cl | 0.10 |

In order to evaluate the possibility of removing a substantial portion of the ash constituents from the residue, several of the residues were refluxed in 6 N HCl for thirty-six hours, filtered and washed, and then leached at about 212° F. in HF for thirty-six hours and again, washed. In all of the samples so treated, ash was reduced to below 2%. While the HF leaching is required to remove the $SiO_2$, almost all of the other major constituents can be removed by HCl treatment at low cost.

EXAMPLE 10

Proximate analyses of a number of extracted residues were obtained. These residues were then refluxed with HCl for forty-eight hours, and proximate analyses then again obtained on each sample. The data obtained upon analyses are recorded in Table V below.

Table V

| Sample | Proximate analyses ||||
|---|---|---|---|---|
| | Moisture | Volatile matter | Fixed carbon | Ash |
| Residue 1: | | | | |
| Before HCl treatment | 1.0 | 16.4 | 63.2 | 19.4 |
| After HCl treatment | 2.2 | 17.0 | 69.6 | 11.2 |
| Residue 2: | | | | |
| Before HCl treatment | 0.1 | 22.1 | 63.3 | 14.5 |
| After HCl treatment | 6.1 | 21.2 | 66.3 | 6.4 |
| Residue 3: | | | | |
| Before HCl treatment | 0.4 | 21.6 | 64.5 | 13.5 |
| After HCl treatment | 0.5 | 21.3 | 71.8 | 6.4 |
| Residue 4: | | | | |
| Before HCl treatment | 0.7 | 19.5 | 69.1 | 10.7 |
| After HCl treatment | 1.2 | 21.2 | 72.7 | 3.9 |

EXAMPLE 11

One of the residues which had been subjected to extraction in accordance with the invention was tested for density, porosity, heat of wetting and surface area, as were certain screen sizes of particles separated from the residue, and a part of the residue was subjected to the acid de-ashing treatment described in Example 10. The values obtained appear in Table VI.

*Table VI*

| | Sample | True density | Apparent density [1] | Porosity percent [2] | Heat of wetting,[3] cal./gram | Area,[4] m.²/g. |
|---|---|---|---|---|---|---|
| 1 | Unscreened, untreated residue. | 1.683 | 1.180 | 29.8 | 16.5 | 165 |
| 2 | Retained on 20-mesh screen. | 1.595 | 1.159 | 30.0 | 17.3 | 173 |
| 3 | Passed 20-mesh screen and retained on 40-mesh screen. | 1.776 | 1.135 | 35.7 | 16.8 | 168 |
| 4 | Passed 40-mesh screen. | 1.827 | ([5]) | | 15.2 | 152 |
| 5 | De-ashed with HCl. | 1.507 | 1.1041 | 30.9 | 20.4 | 204 |

[1] Apparent density determined on 12 x 30 mesh material. Not possible on fine material.
[2] $\text{Porosity} = \dfrac{\text{true density} - \text{apparent density}}{\text{true density}}$
[3] Heat liberated upon wetting 1 gram of carbon with methanol.
[4] About 0.1 calorie is liberated per square meter of carbon surface.
[5] Not determined.

EXAMPLE 12

In order to evaluate the chars produced by the present invention as active carbons for use in treating water, as well as to determine optimum conditions of activation, numerous residue samples were subjected to contact with superheated steam under varying conditions of temperature, residue-to-steam ratio, and time of contact. After such activation treatment, the activated products were evaluated as to their ability to remove impurities from water by use of a standard procedure known as the "phenol method."

In the phenol method, the carbon to be evaluated is added to a solution containing 100 parts per billion of phenol. After filtering the aqueous slurry to remove the carbon and adsorbed phenol, the residual phenol concentration is measured. The results of this test can be reported under three different indices.

(1) The "phenol value" is the parts per million of carbon required to absorb 90% of the contained phenol.

(2) The "phenol number" is the ratio of 90 to the parts per million of carbon required to remove 90 parts per billion of phenol.

(3) The "percent removal," though often used to refer to the percent of phenol adsorbed by 20 parts per million of carbon, was used in the tests run on the residues of the present invention to refer to the percent phenol adsorbed by 50 parts per million of carbon. This modified index was used in order to permit the less active carbons produced to be evaluated.

Tables VII($a$) and VII($b$) below record the data on conditions of activation employed in activating a number of residue samples, and also the phenol method results obtained with such activated residues. The latter values are compared with the phenol values of five high grade, commercially available chars now in use for treating water.

*Table VII(a)*

ACTIVATION OF RESIDUES, ACTIVATION CONDITIONS

| Residue | Run | U.S. Screen No. | Sample weight, grams | Yield percent | Residue/steam ratio | Steaming Temp., °F. | Steaming Time, min. |
|---|---|---|---|---|---|---|---|
| 1 | | (Residue before activation) | | | | | |
| | A | +12 | 25 | 64.0 | 0.250 | 1,550 | 15 |
| | B | −200 | 24 | 79.3 | 0.480 | 1,550 | 15 |
| | C | −12 | 24 | 75.0 | 0.480 | 1,550 | 15 |
| | D | −12 | 50 | 66.0 | 0.625 | 1,450 | 30 |
| 2 | | (Residue before activation) | | | | | |
| | A | +12 | 300 | 89.7 | 0.487 | 1,150 | 60 |
| | B | +12 | 300 | 74.3 | 0.487 | 1,350 | 60 |
| | C | +12 | 300 | 70.7 | 0.639 | 1,550 | 30 |
| | D | +12 | 300 | 69.3 | 0.910 | 1,750 | 30 |
| | E | +12 | 300 | 59.3 | ([1]) | 1,750 | 60 |
| | F | −12 +30 | 300 | 56.7 | 0.750 | 1,750 | 60 |
| | G, HCl leached | +12 | 165 | 74.1 | 1.030 | 1,550 | 40 |
| 3 | | (Residue before activation) | | | | | |
| | A | +14 | 286 | 68.3 | 1.070 | 1,550 | 60 |
| 4 | | (Residue before activation) | | | | | |
| | A | +20 | 300 | 74.1 | ([1]) | 1,550 | 30 |
| | B | −12 +20 | 300 | 65.7 | 1.250 | 1,550 | 30 |
| 5 | | (Residue before activation) | | | | | |
| | A | +20 | 300 | 63.4 | 0.857 | 1,550 | 30 |
| 6 | | (Residue before activation) | | | | | |
| | A | +20 | 300 | 71.7 | 0.667 | 1,550 | 20 |
| 7 | | (Residue before activation) | | | | | |
| | A | +20 | 300 | 56.8 | 1.360 | 1,550 | 30 |
| 8 | | (Residue before activation) | | | | | |
| | A | +20 | 300 | 63.6 | 1.200 | 1,550 | 30 |
| 9 | | (Residue before activation) | | | | | |
| | A | Unsized | 200 | 64.5 | 1.000 | 1,650 | 30 |

[1] Steam leak.

Table VII(b)
ACTIVATION OF RESIDUES, ANALYSIS AND PHENOL TEST

| Residue | Run | Proximate analysis | | | | Phenol | |
|---|---|---|---|---|---|---|---|
| | | H₂O, percent | VM, percent | FC percent | Ash, percent | Value | Percent removed by 50 p.p.m. |
| 1 | Before activation | 1.0 | 16.4 | 63.2 | 19.4 | | 20 |
| | A | 0.0 | 4.8 | 65.1 | 30.1 | 58.0 | |
| | B | 0.1 | 3.6 | 68.5 | 27.8 | 50.0 | |
| | C | 0.2 | 3.8 | 67.1 | 28.9 | 51.5 | |
| | D | 0.1 | 4.3 | 64.9 | 30.7 | 50.0 | |
| 2 | Before activation | 0.9 | 16.2 | 68.4 | 14.5 | | 75.8 |
| | A | 0.3 | 12.3 | 73.5 | 14.1 | | 27 |
| | B | 0.3 | 7.9 | 75.4 | 16.7 | 69.0 | |
| | C | 0.2 | 5.1 | 77.2 | 17.7 | 36.7 | |
| | D | 0.5 | 4.0 | 76.2 | 19.3 | 41.0 | |
| | E | 0.4 | 3.2 | 73.3 | 23.1 | 41.0 | |
| | F | 0.0 | 6.2 | 69.9 | 23.9 | 44.0 | |
| | G, HCl leached | 0.3 | 0.9 | 89.3 | 9.5 | 38.5 | |
| 3 | Before activation | 0.4 | 21.6 | 64.5 | 13.5 | (*) | |
| | A | 0.4 | 5.0 | 75.9 | 18.7 | | 80 |
| 4 | Before activation | 1.6 | 17.0 | 65.3 | 14.1 | | 49.5 |
| | A | 0.0 | 1.7 | 81.4 | 16.9 | 56.3 | |
| | B | 0.0 | 4.3 | 76.3 | 19.4 | 36.8 | |
| 5 | Before activation | 1.2 | 18.3 | 63.0 | 17.5 | | 39 |
| | A | 0.0 | 4.1 | 73.5 | 22.4 | 23.7 | |
| 6 | Before activation | 1.0 | 10.3 | 73.8 | 15.9 | | 80 |
| | A | 0.0 | 4.7 | 73.8 | 21.5 | 32.0 | |
| 7 | Before activation | 3.8 | 27.2 | 51.3 | 17.7 | | 20 |
| | A | 0.0 | 3.1 | 68.5 | 28.4 | 27.7 | |
| 8 | Before activation | 0.8 | 29.2 | 58.0 | 12.0 | (*) | |
| | A | 0.0 | 3.5 | 78.1 | 18.4 | 26.3 | |
| 9 | Before activation | 0.0 | 26.5 | 50.4 | 23.0 | (*) | |
| | A | 0.0 | 2.9 | 46.3 | 50.8 | | 88 |
| | Commercial Char A | | | | | 54 | |
| | Commercial Char B | | | | | 18.6 | |
| | Commercial Char C | | | | | 31.5 | |
| | Commercial Char D | | | | | 25.0 | |
| | Commercial Char E | | | | | 20.0 | |

*No removal or less than 10%.

EXAMPLE 13

It is desirable in most applications of activated carbons to be able to regenerate these carbons after use. An exception to the widespread practice of regeneration exists in the case of pulverized, activated carbons of grades suitable for water treating. In order for activated carbons to be regenerated and reused, it is desirable that the carbon initially be in hard, granular, abrasion-resistant form.

Although it is presently believed that the very low cost of activated carbons produced by the present process will eliminate the need for regeneration and reuse in many cases, the residues in their extracted state, though granular, are quite soft and break down to small sizes. In order to reduce the friability of the residues, briquetting and extruding techniques were carried out on a typical residue to determine the extent to which the hardness thereof might be improved.

Two small portions of the residue (Samples 1 and 2) of about one pound each were mixed with 5% of sulfite liquor (a paper mill waste) as a binder, and the mass extruder through a sausage machine. After drying, the extrusions were broken to about ⅜-inch lengths. Other portions were briquetted using lignite and coal tar pitch as binders. After breaking into particles, all samples were charged to a rotary kiln for steam activation. Tables VIII, IX(a) and IX(b) record data obtained upon the hardness of the pellets or granules produced, and the activation conditions and results, respectively.

Table VIII
PRETREATMENT OF RESIDUES BEFORE ACTIVATION

| Sample | How prepared | Binder and quantity thereof | Pressure, p.s.i.g. | Comments |
|---|---|---|---|---|
| 1 | Extruded | 6%–30% sulfite liquor | | Fragile. |
| 2 | do | do | | Do. |
| 3 | Briquetted | 10% lignite pitch | 10,000 | Hard. |
| 4 | do | 12% coal tar pitch | 10,000 | Do. |
| 5 | do | do | 16,000 | Very hard. |
| 6 | do | 13% lignite pitch | 16,000 | Do. |
| 7 | do | do | 16,000 | Do. |
| 8 | do | 14% coal tar pitch | 16,000 | Do. |

Table IX(a)
ACTIVATION RUNS ON SAMPLES FROM TABLE VIII

| Sample | U.S. screen size | Sample weight, grams | Steam consumed, grams | Yield, percent | Residue/steam ratio | Steaming | |
|---|---|---|---|---|---|---|---|
| | | | | | | Temp., °F. | Time, min. |
| 1 | −4+10 | 233 | 163 | 55.4 | 1.395 | 1,450 | 60 |
| 2 | −4+10 | 235 | 189 | 51.0 | 1.236 | 1,450 | 60 |
| 3 | −4+10 | 135 | 127 | 51.9 | 0.795 | 1,500 | 60 |
| 4 | −4+10 | 122 | 146 | 24.0 | 0.612 | 1,820 | 60 |
| 5 | −4+10 | 161 | 384 | 29.2 | 0.413 | 1,720 | 30 |
| 6 | −4+10 | 107 | 650 | 7.9 | 0.178 | 1,700 | 60 |
| 7 | −4+10 | 120 | 463 | 10.3 | 0.259 | 1,710 | 93 |
| 8 | −4+10 | 169 | 160 | 32.4 | 1.058 | 1,720 | 73 |

Table IX(b)
ACTIVATION RUNS ON SAMPLES FROM TABLE VIII

| Sample | Proximate analysis | | | | Phenol | |
|---|---|---|---|---|---|---|
| | H₂O, percent | VM, percent | FC, percent | Ash, percent | Value | Percent removed by 50 p.p.m. carbon |
| 1 | | | | | | 77 |
| 2 | 0.64 | 8.50 | 73.28 | 17.58 | | 86 |
| 3 | 0.18 | 2.98 | 77.44 | 19.40 | | 83 |
| 4 | 0.27 | 1.41 | 59.79 | 38.54 | | 77 |
| 5 | 0.77 | 5.38 | 52.63 | 41.22 | | 46 |
| 6 | 0.98 | 18.00 | 22.02 | 59.00 | | (¹) |
| 7 | 0.45 | 18.07 | 19.43 | 62.05 | | (¹) |
| 8 | 0.78 | 5.76 | 71.87 | 21.59 | 37.5 | |

¹ Burned.

While the invention has been described in terms of certain embodiments thereof, it is to be understood that it is not limited thereto and includes a variety of operating conditions, the nature of which will be apparent to those skilled in the art from the broad principles hereinbefore described. Such operating conditions are therefore deemed to be contemplated by the disclosure of the present application and to fall within the spirit and scope of the present invention except as they may necessarily be excluded by the language of the following claims.

What is claimed is:

1. The process of producing activated particulate carbonaceous material which comprises:
   contacting coal particles with an organic gas oil solvent at a temperature of from 500° F. to 800° F. and under a pressure sufficient to maintain a substantial amount of the solvent in the liquid state for a time sufficient to extract up to about 50 weight percent of the coal;
   removing residual solvent and extract from the residue of particulate coal; and
   activating the coal residue by contacting at elevated temperatures with an oxidizing gas to increase the ability of said residue to selectively adsorb certain molecular species.

2. A process of producing activated particulate carbonaceous material which comprises:
   subjecting coal particles to a solvent extraction operation wherein an organic gas oil solvent is contacted with the coal particles at a temperature in the range of 500° F. to 800° F. and a pressure sufficient to maintain at least a substantial amount of the solvent in the liquid state and for a time sufficient to extract up to about 50 weight percent of the coal;
   removing residual solvent and extract from the coal residue; and
   activating a portion of the coal residue particles by contacting said portion with an oxidizing gas at a temperature of between 550° F. and 2000° F.

3. The process claimed in claim 2 wherein said solvent is selected from the group consisting of gas oils produced by thermal and catalytic cracking of petroleum oils, gas oils produced by coking of petroleum oils and gas oils produced by coking coal extract.

4. The process claimed in claim 2 wherein said residue portion is activated by contacting the residue portion with superheated steam at a temperature of between 1100° F. and 1800° F. for a period of between fifteen minutes and sixty minutes with a quantity of steam sufficient to give a weight ratio of the residue portion to steam of between about 0.25 and about 1.5.

5. A process of producing activated particulate carbonaceous material as claimed in claim 2 and further characterized to include the steps of:
   briquetting the coal residue particles; and then
   reducing the briquetted coal to the desired particle size prior to activating a portion of said residue whereby the friability of the activated particulate carbonaceous material finally produced may be reduced.

6. A process of producing activated particulate carbonaceous material as claimed in claim 2 and further characterized to include the step of leaching the residue with a mineral acid to reduce the ash content thereof prior to activating a portion of said residue.

7. The process claimed in claim 4 wherein said portion comprises all the particles of said residue which are larger than .017 inch in size, and said portion is contacted with superheated steam at a temperature of about 1550° F. for a period of from twenty to forty minutes in a residue-to-steam ratio of between 0.8 and 1.4.

8. A process for producing activated particulate carbonaceous material from bituminous and subbituminous coals which comprises:
   passing a gas oil solvent through a bed of particulate coal at a temperature of between 700° F. and 775° F. at a pressure sufficient to maintain the solvent in the liquid state, and at a rate of between 0.5 and 10 pounds per pound of coal per hour until between about 3 pounds and 10 pounds of solvent per pound of coal has been passed through the bed;
   removing residual solvent and extract from the coal residue; and
   activating at least a portion of the residue by subjecting said portion to contact with an oxidizing gas at a temperature of between 550° F. and 2000° F.

9. The process of preparing particulate carbonaceous material of large surface area from bituminous and subbituminous coal which comprises:
   placing the coal in particulate form in a fixed bed;
   warming up the coal to between 700° F. and 775° F.;
   passing a gas oil solvent having an API gravity between 5 and 11 and having an ASTM D-1160 distillation range of about 250° F. to 550° F. at 10 mm. of mercury pressure through the bed of pulverized coal at a contact temperature of between 700° F. and 775° F. and a pressure sufficient to retain said solvent in the liquid state;
   continuing to pass said solvent through said coal at a rate of between 0.5 and 10 pounds of solvent per pound of coal per hour until between 20% and 50% of the coal has been extracted by the solvent; then
   cleaning the particulate coal in the bed by steam stripping at temperatures between about 500° F. and 800° F.; and then cooling the residue with water and then activating the residue by contacting with carbon dioxide at a temperature between about 575° F. and about 1800° F.

References Cited by the Examiner
UNITED STATES PATENTS
| | | | |
|---|---|---|---|
| 1,774,585 | 9/30 | Barnebey | 252—421 |
| 2,894,914 | 7/59 | Hassler et al. | 252—425 |
| 3,018,242 | 1/62 | Gorin | 202—11 |

OTHER REFERENCES
Mantell: Industrial Carbon, 2nd ed., pub. by Van Nostrand, 1946, pp. 116–119.

Hassler: Active Carbon, Chemical Publ. Co., 1951, pp. 12–18, 21 and 22.

MAURICE A. BRINDISI, *Primary Examiner.*